United States Patent
Tahernezhaadi et al.

(10) Patent No.: US 6,944,289 B2
(45) Date of Patent: Sep. 13, 2005

(54) DELAY INSERTION FOR ECHO CANCELLATION, WITH ECHO SUPRESSION, IN A COMMUNICATION NETWORK

(75) Inventors: Mansour Tahernezhaadi, Naperville, IL (US); Lee M. Proctor, Cary, IL (US)

(73) Assignee: Motorola, Inc., Schaumburg, IL (US)

( * ) Notice: Subject to any disclaimer, the term of this patent is extended or adjusted under 35 U.S.C. 154(b) by 256 days.

(21) Appl. No.: 10/262,162

(22) Filed: Oct. 1, 2002

(65) Prior Publication Data

US 2004/0062386 A1 Apr. 1, 2004

(51) Int. Cl.[7] .............................................. H04M 9/08
(52) U.S. Cl. ........................... 379/406.01; 379/406.04; 379/406.05; 379/406.06; 379/406.08; 379/406.09; 379/406.12
(58) Field of Search ........................ 379/406.01–406.16

(56) References Cited

U.S. PATENT DOCUMENTS

| | | | | |
|---|---|---|---|---|
| 4,587,382 A | * | 5/1986 | Yang | 370/291 |
| 5,272,695 A | * | 12/1993 | Makino et al. | 370/291 |
| 5,566,167 A | * | 10/1996 | Duttweiler | 370/290 |
| 5,606,550 A | * | 2/1997 | Jangi | 370/289 |
| 6,243,462 B1 | * | 6/2001 | Chujo et al. | 379/406.1 |
| 2001/0040944 A1 | * | 11/2001 | Dunn | |
| 2002/0131583 A1 | * | 9/2002 | Lu | |
| 2003/0118177 A1 | * | 6/2003 | Kakakas et al. | |

* cited by examiner

Primary Examiner—Sinh Tran
Assistant Examiner—Ramnandan Singh
(74) Attorney, Agent, or Firm—Lalita W. Pace

(57) ABSTRACT

The invention provides an apparatus and method for bulk delay insertion prior to echo cancellation, with echo suppression. The exemplary apparatus embodiment (100) bandpass filters (120) and down samples (130), by a down sampling factor, a reference signal and a combined signal that includes an echo of the reference signal. An adaptive echo delay filter (140) determines a plurality of filter coefficients, using the down sampled reference signal, and using an error signal formed as a difference between the down sampled combined signal and the adaptive echo delay filter output. When the filter coefficients have converged, an echo delay time period is determined as a product of the tap location of the maximum filter coefficient and the down sampling factor. When the echo delay time period is greater than the capacity of an associated echo canceller, an adaptive delay inserter (110) inserts the echo delay time period prior to echo cancellation. Following insertion of the delay, echo suppression (170) is implemented while the echo canceller retrains with the new, inserted delay.

25 Claims, 3 Drawing Sheets

DELAY INSERTION FOR ECHO CANCELLATION, WITH ECHO SUPRESSION, IN A COMMUNICATION NETWORK

FIELD OF THE INVENTION

The present invention is related, in general, to communication networks and systems, and more particularly, to delay insertion for echo cancellation, with echo suppression, in communication networks.

BACKGROUND OF THE INVENTION

In a transmission system, such as a wireless or wireline communication network, echo cancellers are typically utilized to provide echo cancellation. As a signal (referred to herein as a "reference signal") is being transmitted from a remote location through a full duplex transmission system, an echo of this reference signal will generally appear, at the remote location, coupled with a local (near end) signal being transmitted from a local or near location to the remote or far location. Generally, such an echo may be either or both an electrical echo, such as from impedance mismatches (e.g., from a 2–4 wire hybrid), or an acoustic echo, from an acoustic path such as a speaker-microphone coupling of a speaker phone or a hands-free mobile telephone. This signal having both the echo signal (a delayed and typically reduced power version of the reference signal) and the local, near end signal, is referred to herein as the "combined signal". For example, without echo cancellation, a person at the remote location would hear the speaker's voice from the local location, plus a delayed version (echo) of what the person at the remote location has said previously. In addition to voice transmission, such echoes appear in data transmission, multimedia transmission, and other forms of information transmission, irrespective of transmission media such as air, wireline, cable, fiber, and so on.

Echo cancellers, which are used to remove the echo portion of the combined signal to form an echo cancelled signal for transmission to the remote location, are generally designed to cancel echoes having variable delays up to a maximum specified delay, such as a maximum delay of 64 ms. Typical echo cancellers, implemented as adaptive filters, generate a synthetic echo based upon training of the filter in the transmission system. The synthetic echo is preferably a close match to the actual echo, and the synthetic echo is subtracted from the combined signal, by the echo canceller, to produce an echo cancelled signal. Under various circumstances, however, depending upon network conditions, such as heavy traffic conditions, there may be an increased delay beyond the capacity of the echo canceller employed. When the delay of the incident echo exceeds this maximum amount, the echo canceller treats the echo as a local or near end signal, such as near end speech, and allows it to be transmitted to the remote location. As a consequence, the echo canceller is unable to cancel the echo, resulting in an unacceptable communication session.

Various prior art methods of determining echo delay, and inserting a bulk delay to accommodate an echo, have significant deficiencies. Many are open-loop systems, and are unable to provide actual measurements of echo return loss and, as a consequence, cannot coordinate with and release control from an echo canceller to allow for delay insertion and echo suppression. Such open-loop structures are also subject to significant interference. Other prior art techniques, including those using cross-correlation methods, are unable to prevent echo leakage during retraining of an echo canceller and are unable to provide echo suppression.

A need remains, therefore, for an apparatus and method to provide echo cancellation under circumstances in which the delay in the echo path exceeds the delay capacity of the echo canceller. Such an apparatus and method should respond to conditions of greater delay in the echo path, and enable an echo canceller to remove the echo from the combined signal. In addition, such an apparatus and method should be robust under conditions of interference, should coordinate with an independent echo canceller, and should provide echo suppression.

SUMMARY OF THE INVENTION

The present invention provides an apparatus and method for bulk delay insertion prior to echo cancellation, with echo suppression to prevent echo leakage during retraining of the echo canceller. The invention bandpass filters and down samples, by a factor M, a reference signal and a combined signal (that includes an echo of the reference signal). An adaptive echo delay filter determines a plurality of filter coefficients, using the down sampled reference signal, and using an error signal formed as a difference between the down sampled combined signal and the adaptive echo delay filter output. When the filter coefficients have converged, an echo delay time period is determined as a product of the tap or filter location of the maximum filter coefficient and the down sampling factor M. When the echo delay time period is greater than the capacity of an associated echo canceller, an adaptive delay inserter inserts the echo delay time period prior to echo cancellation. Following insertion of the delay, echo suppression is implemented while the echo canceller retrains with the new, inserted delay.

The present invention thereby allows for echo cancellation when the echo delay is beyond the capacity of the echo canceller. The present invention independently determines and responds to conditions of greater delay in the echo path, inserts a bulk delay in the echo cancellation path, and enables an echo canceller to remove the echo from the combined signal. In addition, the apparatus and method of the invention provide increased robustness in the presence of interference by using a closed-path (feedback) structure in estimating the echo delay. The present invention also provides a direct measure of the echo return loss (ERL), enabling the apparatus (adaptive echo delay filter and echo suppressor) to work in harmony with a pre-existing echo canceller. As a consequence, no modifications are required in the echo canceller, and the present invention is thereby backwards compatible with existing systems.

Numerous other advantages and features of the present invention will become readily apparent from the following detailed description of the invention and the embodiments thereof, from the claims and from the accompanying drawings.

BRIEF DESCRIPTION OF THE DRAWINGS

The foregoing and other objects, features and advantages of the present invention will be more readily appreciated upon reference to the following disclosure when considered in conjunction with the accompanying drawings, in which.

DETAILED DESCRIPTION OF THE INVENTION

Figure 1:
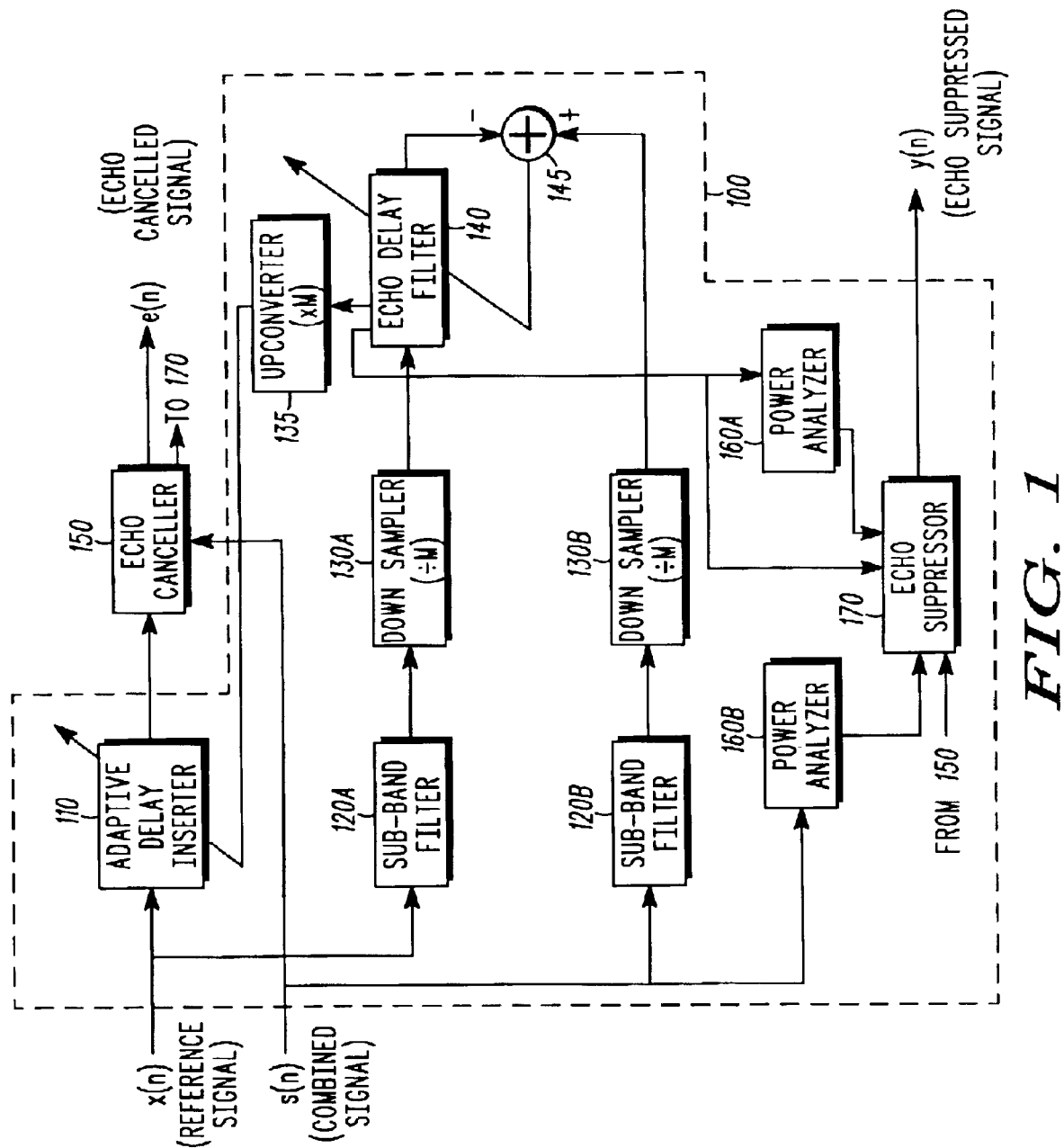
FIG. 1 is a block diagram illustrating an exemplary apparatus embodiment for delay insertion for echo cancellation in accordance with the present invention.

While the present invention is susceptible of embodiment in many different forms, there are shown in the drawings and will be described herein in detail specific embodiments thereof, with the understanding that the present disclosure is to be considered as an exemplification of the principles of the invention and is not intended to limit the invention to the specific embodiments illustrated.

As mentioned above, a need exists for a method and system to provide echo cancellation under circumstances of delay in the echo path beyond the capacity of the echo canceller. The present invention provides such an apparatus and method, which independently determine and respond to conditions of greater delay in the echo path, which insert a bulk delay in the echo cancellation path, and which enable an echo canceller to remove the echo from the combined signal. In addition, the apparatus and method of the invention provide echo suppression, until the echo canceller has reconverged to accommodate the inserted delay.

The present invention also overcomes various deficiencies of the prior art, including providing increased robustness in the presence of interference by using a closed-path (feedback) structure in estimating the echo delay. The present invention also provides a direct measure of the echo return loss (ERL), enabling the apparatus (adaptive echo delay filter and echo suppressor) to work in harmony with a pre-existing echo canceller. As a consequence, no modifications are required in the echo canceller, and the present invention is thereby backwards compatible with existing systems.

FIG. 1 is a block diagram illustrating an exemplary apparatus embodiment 100 for delay insertion for echo cancellation in accordance with the present invention. As illustrated, the exemplary apparatus 100 includes an adaptive delay block 110, such as a buffer, for insertion of a variable delay prior to echo cancellation by echo canceller 150. The echo canceller 150 may be implemented as known in the art, and will be assumed to be operable to cancel an incident echo which has a delay up to a maximum, specified delay. The duration (or amount) of delay inserted (by the adaptive delay inserter 110), if any, is controlled by the adaptive echo delay filter 140 which, as illustrated, has a closed-loop feedback system based on an error signal from combiner (adder) 145, as the difference between the output of the adaptive echo delay filter 140 and a filtered, down sampled version of the combined signal s(n) (discussed in greater detail below). The apparatus 100 further includes bandpass filters 120A and 120B which operate within a sub-band of the spectrum of the communication session (individually and collectively referred to herein as sub-band filters 120), and down samplers 130A and 130B (individually and collectively referred to herein as down samplers 130), for providing input into the adaptive echo delay filter 140.

When additional delay is inserted by the adaptive delay inserter 110, the echo canceller 150 will generally require a period of time to reconverge, and during this interim time period, undesirable echo may be transmitted back to the remote location. As a consequence, for echo suppression during this interim period, the exemplary apparatus 100 may further include power analyzers 160A and 160B (individually and collectively referred to herein as power analyzers 160), and echo suppressor 170, for generation of an echo suppressed signal y(n) for transmission to the remote location (in lieu of echo transmission).

Continuing to refer to FIG. 1, the reference signal x(n) and the combined signal s(n) are each bandpass filtered, using sub-band filter 120A and sub-band filter 120B, respectively. Depending upon the spectral band of the particular type of communication session, such as a voice session or a data session, in accordance with the present invention, a suitable sub-band is selected for use in the sub-band filters 120, for examination of a smaller portion of the transmission spectrum. For example, for a voice communication session having a spectrum from roughly zero to 4,000 Hz, in accordance with the present invention, the selected sub-band for bandpass filtering is centered at 1000 Hz with a 500 Hz bandwidth (i.e., bandpass filtering from 750 to 1250 Hz). This sub-band filtering enables a significant decrease in the sampling rate (down sampling) to twice the bandwidth, such as a down sampling by a factor of 8 or 16 compared to the sampling rate of 8000 Hz for the 4000 Hz transmission spectrum. In addition, the sub-band filtering decreases the probability that a near end signal is included with the echo in the selected band, so that any near end speech, for example, may not always provide significant interference. It should be noted that the sub-band filters 120A and 120B are adaptive filters, and are considered to have converged when the peak location is not moving and the power at the peak location exceeds a certain threshold, such as −30 dB.

Following sub-band filtering, the sub-band filtered reference and combined signals are each down sampled by a factor of M in corresponding down samplers 130A and 130B. The sub-band filtered and down sampled reference signal information, output from down sampler 130A, is utilized as input into the adaptive echo delay filter 140. The sub-band filtered and down sampled combined signal information, output from down sampler 130B, is utilized in combiner 145 to provide an error signal for feedback to the adaptive echo delay filter 140.

Another significant advantage from the down sampling by a factor of M, in accordance with the present invention, is a corresponding expansion of the time period covered by a given number of samples. For example, if the reference signal were sampled at 8000 Hz, to provide coverage for 128 ms of delay, 1024 coefficients would be needed for the adaptive echo delay filter 140. In contrast, with the present invention, down sampling by a factor of M=16 enables use of a considerably smaller filter 140, which also covers a greater period of delay. For example, 300 ms of potential additional delay, down sampled by a factor of 16 in a voice communication (sampling rate of 8000/16), would require only 150 samples and a corresponding 150 complex coefficients in adaptive echo delay filter 140, proving echo delay coverage of 300 ms plus the maximum delay (e.g., 64 ms) of the echo canceller 150, to produce a total delay coverage of 364 ms.

As indicated above, the sub-band filtered and down sampled reference signal information, output from down sampler 130A, is utilized as input into and training for the adaptive echo delay filter 140. The adaptive echo delay filter 140 is trained using a close-loop methodology, using an error signal from combiner 145, as the difference between the output of the adaptive echo delay filter 140 and the filtered, down sampled combined signal. If and when the adaptive echo delay filter 140 has converged, the adaptive echo delay filter 140 will generally have a stable peak, with a maximum coefficient compared to the other coefficients of the adaptive echo delay filter 140 (i.e., the filter coefficient having a comparatively maximal magnitude). The corresponding location (tap) of the maximum coefficient (provided as input to upconverter 135), is upconverted to real time (by multiplying by the down sampling factor M), and thereby provides a measure of the actual echo delay time period. For example, a maximum coefficient at the $80^{th}$ tap, multiplied by the down sampling factor of 16, indicates an echo delay of 160 ms, corresponding to 1280 real time samples (at a sampling rate of 8000 Hz (or 125 $\mu$s/sample)). The measured echo delay is then provided to adaptive delay inserter 110. Alternatively, this upconversion function to determine the echo delay time period, as a product of the tap location and the down sampling factor, may be included in either the adaptive echo delay filter 140 or the adaptive delay inserter 110.

The maximum coefficient may also be used as a measure of the energy of the echo, so that the measured echo delay is only inserted when the measured echo energy is greater than a predetermined value (e.g., when 10 log|max coefficient|$^2$ is greater than −30 dB). The measured energy of the echo may also be used as a measure of the echo return loss (ERL), utilized for the echo suppression discussed below. When the measured echo delay is greater than the separate echo delay capacity of the echo canceller 150, and when the measured echo energy is greater than a predetermined threshold, the adaptive delay inserter 110 provides (inserts) a corresponding delay, prior to echo cancellation, resulting in an overall delay capacity, for echo cancellation, of the inserted delay (e.g., 160 ms) plus the separate capacity of the echo canceller (e.g., up to 64 ms). As an additional condition for insertion of a delay, depending upon the selected embodiment, the convergence of the echo canceller 150 may also be examined, such that if convergence has degraded or the error energy rises, insertion of a delay may be appropriate. Following insertion of the measured echo delay by adaptive delay inserter 110, the echo canceller 150 is allowed to retrain, and once the echo canceller 150 has reconverged, an echo cancelled signal e(n) is provided.

During the interim period when the echo canceller 150 is retraining, the present invention also provides echo suppression, using echo suppressor 170, so that the echo of the reference signal is not transmitted to the remote location. For echo suppression, any of a plurality of signals may be provided by echo suppressor 170; In the exemplary embodiment, the signal provided is "comfort noise", such as static or other background energy. In the interim period when the echo canceller 150 has not yet converged, and when the sum (in dB) of the power or energy of the time adjusted reference signal plus the ERL is greater than the power (or energy) of the combined signal, as measured by power analyzers 160A and 160B, respectively, the echo suppressor 170 is enabled, and an echo suppressed signal y(n) is provided. In the exemplary embodiment of the apparatus 100, rather than using a measured and variable ERL for echo suppression determination, various fixed ERLs are utilized, depending upon the power level of the reference signal, as discussed in greater detail below with respect to FIG. 2. In addition, as part of the various inputs into power analyzers 160A and 160B, and into echo suppressor 170, the time aligned reference signal power, and the floor energies of the reference signal and the combined signal, are also provided.

It should be noted that convergence of the echo canceller 150, implemented as an adaptive filter, may be determined by monitoring the variation in peak location within the adaptive filter, the power at the peak location exceeds a certain threshold, and its output signal power is lower than the combined signal power by a certain threshold, such as by −8 dB.

Another feature of the exemplary apparatus embodiment 100, to avoid divergence of the adaptive echo delay filter 140 (and the echo canceller 150), is the detection of a "double-talk" condition. Proper convergence of these filters generally requires that the filters train under conditions of relatively pure echo, without near end (local) input, such as near end (local) speech. In the exemplary embodiment, a predetermined threshold is utilized, namely, a fixed ERL of −6 dB, such that if the sub-band power of the combined signal s(n) is lower than the sub-band power of the reference signal x(n) by the predetermined threshold (e.g., at least 6 dB), adaptation is allowed.

Yet another feature of the exemplary apparatus embodiment 100 is responsiveness to changes in communication session (or call) connection status. The adaptive delay inserter 110 and the adaptive echo delay filter 140 are responsive to one or more control signals, from a call processing unit, to disable, reset and/or retrain upon a change in call connection status. More particularly, in response to such control signals, the adaptive delay inserter 110 is responsive to disable and reset, and the adaptive echo delay filter 140 is responsive to reset and retrain.

Continuing to refer to FIG. 1, it should be noted that while separate functional blocks are illustrated, the apparatus 100 may be implemented as a combination of various filters, such as adaptive echo delay filter 140 and the sub-band filters 120, with processing capability, such as by use of a digital signal processor ("DSP"), with associated memory and buffers. For example, many of the calculations and determinations may be implemented through DSP instructions. As a consequence, the various functional blocks of the apparatus 100 may be implemented as a processor, as the term processor is used herein, such that this implementation may include a single integrated circuit ("IC"), or may include a plurality of integrated circuits or other components connected, arranged or grouped together, such as microprocessors, digital signal processors ("DSPs"), custom ICs, application specific integrated circuits ("ASICs"), field programmable gate arrays ("FPGAs"), adaptive computing ICs, associated memory (such as RAM and ROM), and other ICs and components. As a consequence, as used herein, the term processor should be understood to equivalently mean and include a single IC, or arrangement of custom ICs, ASICs, processors, microprocessors, controllers, FPGAs, adaptive computing ICs, or some other grouping of integrated circuits which perform the functions discussed below, with associated memory, such as microprocessor memory or additional RAM, DRAM, SRAM, MRAM, ROM, EPROM or E$^2$PROM. The processor, with its associated memory, may be configured (via programming, FPGA interconnection, or hard-wiring) to perform the methodology of the invention, as discussed above and as further discussed below. For example, the methodology may be programmed and stored, in a processor with its associated memory (and/or additional memory or buffers) and other equivalent components, as a set of program instructions (or equivalent configuration or other program) for subsequent execution when the processor is operative (i.e., powered on and functioning). Equivalently, when the apparatus 200 is implemented in whole or part as FPGAs, custom ICs and/or ASICs, the FPGAs, custom ICs or ASICs also may be designed, configured and/or hard-wired to implement the methodology of the invention. For example, the apparatus 200 may implemented as an arrangement of microprocessors, DSPs and/or ASICs, collectively referred to as a "processor", which are respectively programmed, designed or configured to implement the methodology of the invention. Additional memory may also be used, which may be any type of memory device, memory integrated circuit ("IC"), or memory portion of an integrated circuit (such as the resident memory within a processor IC), such as RAM, FLASH, DRAM, SRAM, MRAM, FeRAM, ROM, EPROM or $E^2$PROM, or any other type of memory or data storage apparatus or circuit, depending upon the selected embodiment, such as a magnetic hard drive or an optical storage device, or any other type of data storage apparatus.

Figure 2A:
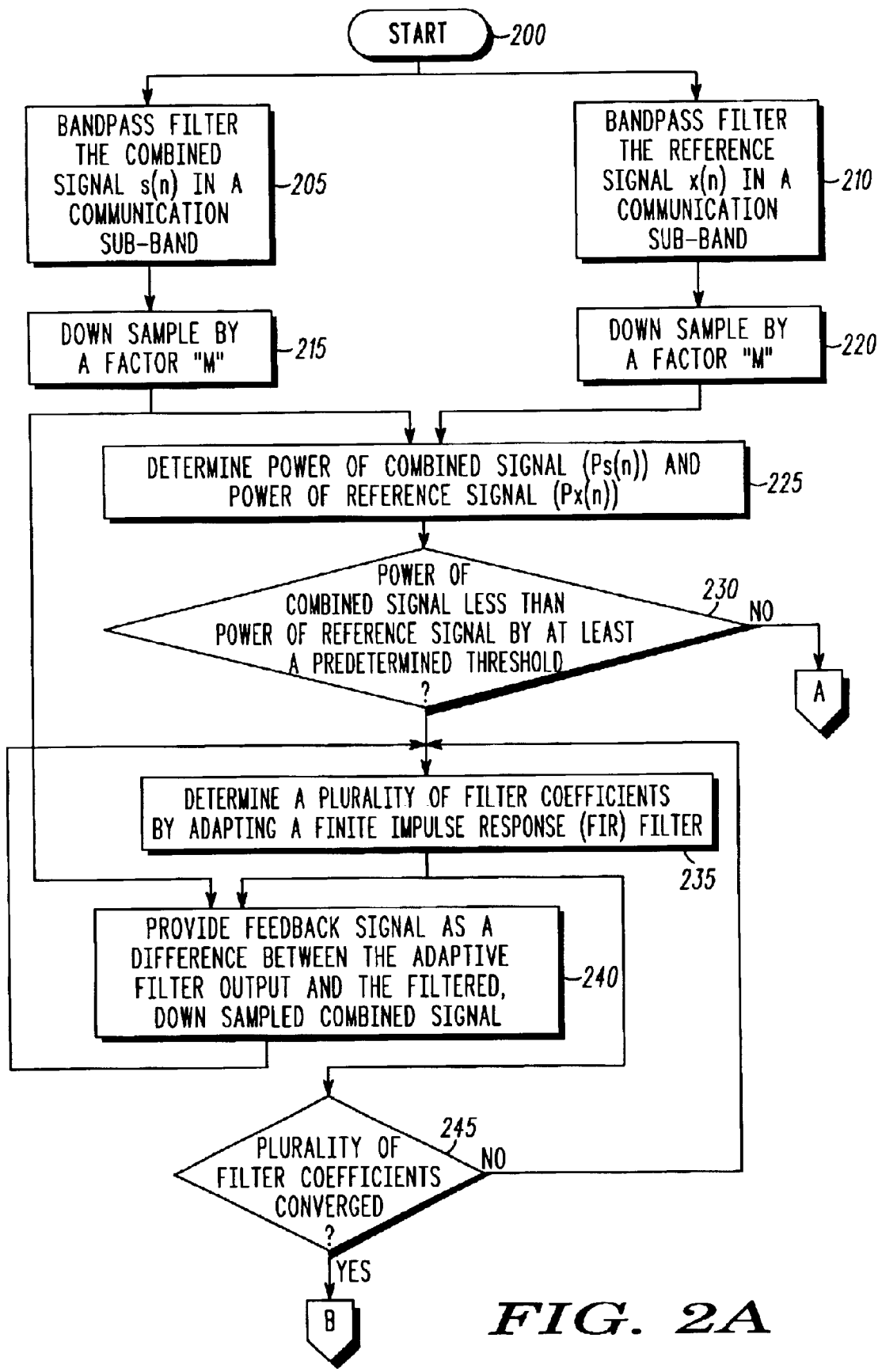
FIG. 2 is a flow diagram illustrating an exemplary method embodiment for delay insertion for echo cancellation, with echo suppression, in accordance with the present invention.
Figure 2B:
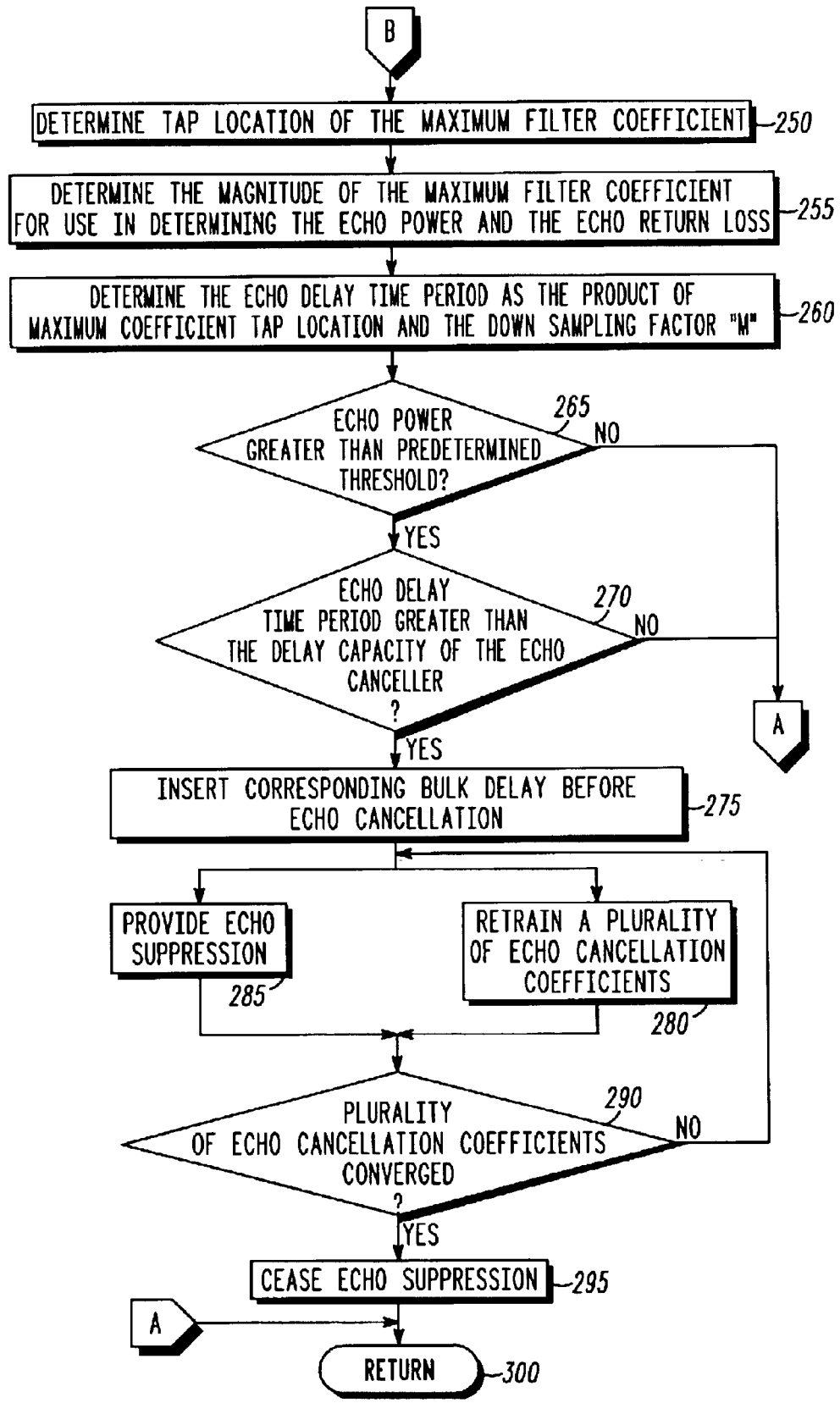

FIG. 2 is a flow diagram illustrating an exemplary method embodiment for delay insertion for echo cancellation, with echo suppression, and provides a useful summary of the present invention. As indicated above, such methodology may be implemented in various ways, such as through DSP instructions, and may be stored in various media, from RAM, ROM to CDROM or floppy disk. In addition, while for ease of discussion, the method is illustrated in FIG. 2 with start and return steps, it should be understood that the method generally operates continuously or iteratively, continually determining whether a significant echo delay may be occurring, and potentially inserting corresponding bulk delays.

Referring to FIG. 2, the method begins, start step 200, with bandpass filtering, in a communication sub-band, of the combined signal s(n), step 205, and of the reference signal x(n), step 210. Next, each of the corresponding filtered signals is down sampled by a factor of M, in corresponding steps 215 and 220. The power or energy of both the filtered and down sampled signals are determined, step 225. Next, in step 230, when the power of the filtered, down sampled combined signal (Ps(n)) is lower than the power of filtered, down sampled reference signal (Px(n)) by a minimum, threshold amount or other predetermined, minimum magnitude, such as lower by at least 6 dB, the method proceeds to step 235, and adapts a finite impulse response filter to form filter coefficients. During this adaptation, an error signal is also generated, for feedback to the filter, from the filtered, down sampled combined signal and from the adaptive echo filter output, step 240. When the power of the filtered, down sampled combined signal (Ps(n)) is not lower than the power of filtered, down sampled reference signal (Px(n)) by the threshold in step 230, indicating a potential double-talk condition, the FIR filter is not allowed to adapt, and the method may end (temporarily), return step 300. As an alternative, this power determination may be performed later in the method, as the filter is adapting, the energy of the combined signal is examined at about the same time slot (tap location) corresponding to the peak coefficient location (in adaptive filter 140). This is done in order to time align the reference signal power for direct comparison with the combined signal power. For this alternative, when the power difference meets the threshold criterion, the results of the filter convergence (step 245) will be utilized, as discussed below (steps 250 and following).

As the filter is adapting in step 235, the method determines whether the filter has converged, step 245, typically be determining whether a stable peak (maximum) coefficient has been generated (i.e., the filter coefficients have settled and are not transient based upon a predetermined threshold (or count)), and by whether the energy or power associated with the stable peak coefficient is greater than a predetermined threshold, such as greater than −30 dB. If the filter has not converged in step 245, the method continues to allow the filter to adapt, returning to step 235. When the filter has converged in step 245, the method determines the filter location (tap location) of the peak (or maximum) filter coefficient, step 250. The method may also determine the magnitude of the maximum filter coefficient, for use in determining the echo power or energy (or echo return loss) at that time, step 255. Next, an echo delay time period is determined as the product of the filter location multiplied by the down sample factor M, step 260.

Continuing to refer to FIG. 2, two criteria or conditions are utilized to determine whether a bulk delay should be inserted. First, in step 265, the method determines whether the power (or energy) of the echo is greater than a predetermined threshold (as a very low power echo may be tolerable under certain conditions). Second, in step 275, the method determines whether the echo delay time period, calculated previously, is greater than the capacity of the echo canceller (or, alternatively, greater than a predetermined threshold above the capacity of the echo canceller). When the echo energy is not greater than the predetermined threshold in step 265, or when the echo delay time period is not greater than the capacity of the echo canceller in step 270, the method may cease (temporarily), return step 300. Conversely, when the echo energy is greater than the predetermined threshold in step 265, and when the echo delay time period is greater than the capacity of the echo canceller in step 270, the method inserts a corresponding bulk delay (i.e., corresponding to the echo delay time period), step 275.

With the insertion of the bulk delay, the echo canceller will retrain, step 280. Concurrently with the retraining, in step 285, the method will provide echo suppression. The method continues to provide echo suppression while the echo canceller is retraining, i.e., until the echo canceller has converged, step 290. When the echo canceller has converged (or reconverged) to accommodate the bulk delay, in step 290, the provision of echo suppression may end, step 295 (and the method may end, return step 300). As indicated above, however, the method of the present invention operates continuously (or iteratively), with start and return steps illustrated merely for ease of explanation.

Numerous advantages of the present invention are readily apparent. First, the present invention provides a method and system for echo cancellation under circumstances of delay in the echo path beyond the capacity of the echo canceller. The embodiments of the present invention independently determine and respond to conditions of greater delay in the echo path and insert a bulk delay in the echo cancellation path, enabling an echo canceller to remove the echo from the combined signal. In addition, the apparatus and method of the invention provide echo suppression, until the echo canceller has reconverged to accommodate the inserted delay.

The present invention also overcomes various deficiencies of the prior art, including providing increased robustness in the presence of interference by using a closed-path (feedback) structure in estimating the echo delay. The present invention also provides a direct measure of the echo return loss, enabling the apparatus to work in coordination with a pre-existing echo canceller. As a consequence, no modifications are required in the echo canceller, and the present invention is backwards compatible with existing systems.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

What is claimed is:

1. A method for delay insertion for echo cancellation for communication in a selected frequency spectrum, the echo cancellation having a predetermined time period capacity, the method comprising:

(a) down sampling, by a down sampling factor, a spectral portion of a reference signal and a spectral portion of a combined signal to form, respectively, a down sampled reference signal and a down sampled combined signal, wherein the combined signal includes an echo of the reference signal;

(b) determining a plurality of filter coefficients using a feedback signal formed as a difference between an adaptive echo delay filter output and the down sampled combined signal, each filter coefficient of the plurality of filter coefficients having a filter location;

(c) when the plurality of filter coefficients have converged, determining a maximum filter coefficient of the plurality of filter coefficients and determining a corresponding maximum coefficient filter location;

(d) determining an echo delay time period as a product of the corresponding maximum coefficient filter location and the down sampling factor; and (e) when the echo delay time period is greater than the predetermined time period capacity for echo cancellation, inserting the echo delay time period prior to echo cancellation.

2. The method of claim 1, further comprising:

(f) following insertion of the echo delay time period, providing for retraining of a plurality of echo cancellation coefficients.

3. The method of claim 2, further comprising:
concurrently providing echo suppression until a convergence of the plurality of echo cancellation coefficients.

4. The method of claim 1, wherein step (a) further comprises:
determining the spectral portion of the reference signal and the spectral portion of a combined signal by respectively band pass filtering the reference signal and the combined signal in a selected sub-band of the selected frequency spectrum.

5. The method of claim 4, wherein the selected sub-band is centered at 1000 Hz, with a 500 Hz bandwidth, for a voice communication.

6. The method of claim 1, wherein step (b) further comprises:
determining the plurality of filter coefficients only when a time aligned, combined signal power level is less than a reference signal power level by at least a predetermined threshold.

7. The method of claim 1, wherein step (c) further comprises:
determining a magnitude of the maximum filter coefficient to determine an echo power.

8. The method of claim 7, wherein step (d) further comprises:
inserting the echo delay time period only when the echo power is greater than a predetermined threshold.

9. The method of claim 1, wherein step (C) further comprises:
determining a magnitude of the maximum filter coefficient to determine an echo return loss.

10. The method of claim 1, further comprising:

(g) in response to a control signal indicating a change in connection status, disabling and resetting insertion of the echo delay time period, and resetting and retraining the plurality of filter coefficients.

11. An apparatus for delay insertion for echo cancellation for communication in a selected frequency spectrum, the apparatus coupleable to an echo canceller having a predetermined time period capacity for echo cancellation, the apparatus comprising:

a first down sampler, the first down sampler operative to down sample, by a factor M, a spectral portion of a reference signal to form a down sampled reference signal;

a second down sampler, the second down sampler operative to down sample, by a factor M, a spectral portion of a combined signal to form a down sampled combined signal, wherein the combined signal includes an echo of the reference signal;

an adaptive echo delay filter coupled to the first down sampler, the adaptive echo delay filter operative to determine a plurality of filter coefficients using the down sampled reference signal, each fitter coefficient of the plurality of filter coefficients having a filter location; the adaptive echo delay filter further operative, when the plurality of filter coefficients have converged, to determine a maximum filter coefficient of the plurality of filter coefficients and to determine a corresponding maximum coefficient filter location; and an adaptive delay inserter coupled to the adaptive echo delay filter, the adaptive delay inserter operative, when an echo delay time period is greater than the predetermined time period capacity for echo cancellation, to insert the echo delay time period prior to echo cancellation, the echo delay time period formed as a product of the corresponding maximum coefficient filter location and the down sampling factor.

12. The apparatus of claim 11, further comprising:
an echo suppressor coupled to the adaptive echo delay filter, the echo suppressor operative to provide echo suppression, following insertion of the echo delay time period, until a convergence of a plurality of echo cancellation coefficients.

13. The apparatus of claim 11, further comprising:
a first bandpass filter coupled to the first down sampler, the first bandpass filter for filtering the reference signal in a selected sub-band of the selected frequency spectrum to provide the spectral portion of the reference signal; and a second bandpass filter coupled to the second down sampler, the second bandpass filter for filtering the combined signal in a selected sub-band of the selected frequency spectrum to provide the spectral portion of the combined signal.

14. The apparatus of claim 13, wherein the first bandpass filter and the second bandpass lifter each have a center frequency at 1000 Hz, with a 500 Hz bandwidth, for a voice communication.

15. The apparatus of claim 11, further comprising:
a combiner coupled to the adaptive echo delay filter and to the second down sampler, the combiner operative to form an error signal for feedback to the adaptive echo delay filter, the error signal formed as a difference between an output of the adaptive echo delay filter and the down sampled combined signal.

16. The apparatus of claim 11, wherein the adaptive echo delay filter is further operative to determine the plurality of filter coefficients only when a time aligned, combined signal power level is less than a reference signal power level by at least a predetermined threshold.

17. The apparatus of claim 11, wherein the adaptive echo delay filter is further operative to determine a magnitude of the maximum filter coefficient to determine an echo power.

18. The apparatus of claim 17, wherein the adaptive delay inserter is operative to insert the echo delay time period only when the echo power is greater than a predetermined threshold.

19. The apparatus of claim 11, wherein the adaptive echo delay filter is further operative to determine a magnitude of the maximum filter coefficient to determine an echo return loss.

20. The apparatus of claim 11, wherein, in response to a control signal indicating a change in connection status, the adaptive delay inserter is capable of disabling and resetting, and the adaptive echo delay filter is capable of resetting and retraining the plurality of filter coefficients.

21. An apparatus for delay insertion for echo cancellation for communication in a selected frequency spectrum, the apparatus coupleable to an echo canceller having a predetermined time period capacity for echo cancellation, the apparatus comprising:

a first bandpass filter for filtering a reference signal in a selected sub-band of the selected frequency spectrum to provide a spectral portion of the reference signal;

a first down sampler coupled to the first bandpass filter, the first down sampler operative to down sample, by a down sampling factor, the spectral portion of the reference signal to form a down sampled reference signal;

a second bandpass filter coupled to the second down sampler, the second bandpass filter for filtering a combined signal in the selected sub-band of the selected frequency spectrum to provide a spectral portion of the combined signal, wherein the combined signal includes an echo of the reference signal;

a second down sampler coupled to the second bandpass filter, the second down sampler operative to down sample, by the down sampling factor, the spectral portion of the combined signal to form a down sampled combined signal;

an adaptive echo delay filter coupled to the first down sampler, the adaptive echo delay filter operative to determine a plurality of filter coefficients using the down sampled reference signal, each filter coefficient of the plurality of filter coefficients having a filter location; the adaptive echo delay filter further responsive to an error signal formed as a difference between an output of the adaptive echo delay filter and the down sampled combined signal; the adaptive echo delay filter further operative, when the plurality of filter coefficients have converged, to determine a maximum filter coefficient of the plurality of filter coefficients and to determine a corresponding maximum coefficient filter location;

an adaptive delay inserter coupled to the adaptive echo delay filter, the adaptive delay inserter operative when an echo delay time period is greater than the predetermined time period capacity for echo cancellation, the echo delay time period determined as a product of the corresponding maximum coefficient filter location and the down sampling factor, to insert the echo delay time period prior to echo cancellation; and an echo suppressor coupled to the adaptive echo delay filter, the echo suppressor operative to provide echo suppression, following an insertion of the echo delay time period, until a convergence of a plurality of echo cancellation coefficients.

22. The apparatus of claim 21, wherein the first bandpass filter and the second bandpass filter each have a center frequency at 1000 Hz, with a 500 Hz bandwidth, for a voice communication.

23. The apparatus of claim 21, wherein the adaptive echo delay filter is further operative to determine the plurality of filter coefficients only when a combined signal power level is less than a reference signal power level by at least 6 dB.

24. The apparatus of claim 21, wherein the adaptive echo delay filter is further operative to determine a magnitude of the maximum filter coefficient to determine an echo power and to determine an echo return loss.

25. The apparatus of claim 21, wherein, in response to a control signal indicating a change in connection status, the adaptive delay inserter is capable of disabling and resetting, and the adaptive echo delay filter is capable of resetting and retraining the plurality of filter coefficients.

* * * * *